United States Patent
Liao et al.

(10) Patent No.: US 11,474,627 B2
(45) Date of Patent: Oct. 18, 2022

(54) METHOD, APPARATUS AND DEVICE FOR ERASING HANDWRITING ON ELECTRONIC WHITEBOARD

(71) Applicant: YEALINK (XIAMEN) NETWORK TECHNOLOGY CO., LTD., Fujian (CN)

(72) Inventors: Chaomin Liao, Fujian (CN); Wanjian Feng, Fujian (CN); Xiaosheng Lin, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 16/995,811

(22) Filed: Aug. 18, 2020

(65) Prior Publication Data
US 2021/0055803 A1    Feb. 25, 2021

(30) Foreign Application Priority Data
Aug. 23, 2019 (CN) .......................... 201910781500.6

(51) Int. Cl.
*G06F 3/038*    (2013.01)
*G06F 3/0354*    (2013.01)
*G06F 3/0488*    (2022.01)

(52) U.S. Cl.
CPC .......... *G06F 3/038* (2013.01); *G06F 3/03543* (2013.01); *G06F 3/0488* (2013.01)

(58) Field of Classification Search
CPC .. G06F 3/03543; G06F 3/038; G06F 3/04845; G06F 3/0488; G06F 3/04883; G06F 3/041; G06F 3/0482; G06F 3/04842; G06K 9/00402; G06N 20/00
See application file for complete search history.

(56) References Cited

U.S. PATENT DOCUMENTS

| | | | | |
|---|---|---|---|---|
| 2005/0088426 A1* | 4/2005 | Smirnov | ............... | G06F 3/0488 345/179 |
| 2008/0297482 A1* | 12/2008 | Weiss | ...................... | G06F 3/041 345/173 |
| 2015/0324694 A1* | 11/2015 | Wang | ..................... | G06N 20/00 706/12 |
| 2016/0048318 A1* | 2/2016 | Markiewicz | ........ | G06F 3/04842 345/173 |
| 2016/0253075 A1* | 9/2016 | Weiss | .................... | G06F 3/0482 715/767 |
| 2017/0109917 A1* | 4/2017 | Wang | .................... | G06F 3/0488 |
| 2018/0018085 A1* | 1/2018 | Watanabe | ........... | G06F 3/04845 |
| 2018/0046345 A1* | 2/2018 | Elhard | ............... | G06F 3/04845 |
| 2018/0246630 A1* | 8/2018 | Choi | .................... | G06F 3/0488 |
| 2018/0348955 A1* | 12/2018 | Gao | .................... | G06F 3/04883 |

* cited by examiner

*Primary Examiner* — Richard J Hong

(57) ABSTRACT

The present disclosure discloses a method, an apparatus and a device for erasing handwriting on an electronic whiteboard. The method includes the following steps: obtaining first contact points; enabling an erasing mode when a quantity of the first contact points is greater than a preset value; obtaining second contact points in the erasing mode, and calculating an erasing region according to the first contact points and the second contact points; and deleting handwriting data in the erasing region. Using the method for erasing handwriting on an electronic whiteboard provided by the present disclosure can enter an erasing mode rapidly and erase handwriting effectively, thus improving the practicability of the electronic whiteboard.

5 Claims, 3 Drawing Sheets

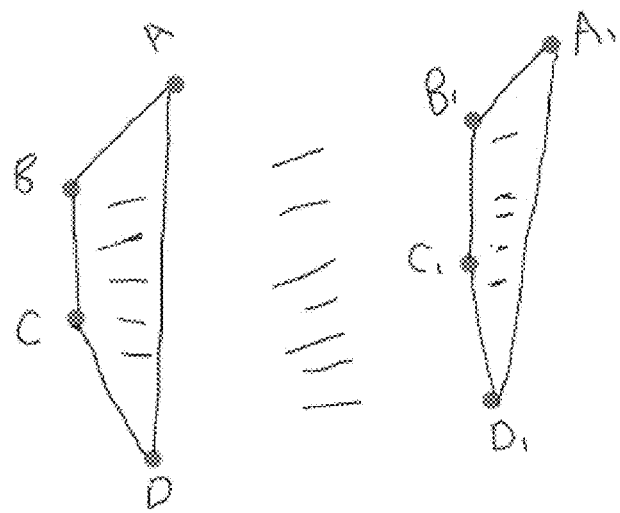
FIG. 1
```
Obtain first contact points, and enable an erasing mode when a quantity of the first    S101
contact points is greater than a preset value
Obtain second contact points in the erasing mode, and calculate an erasing region       S102
according to the first contact points and the second contact points
Delete handwriting data in the erasing region                                           S103
```
FIG. 2
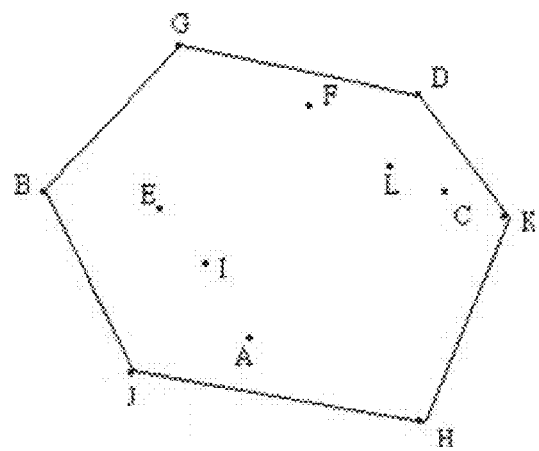
FIG. 3

METHOD, APPARATUS AND DEVICE FOR ERASING HANDWRITING ON ELECTRONIC WHITEBOARD

CROSS-REFERENCE TO RELATED APPLICATIONS

The present application claims the benefit of Chinese Patent Application No. 201910781500.6 filed on Aug. 23, 2019, the contents of which are hereby incorporated by reference.

TECHNICAL FIELD

The present disclosure relates to the field of information processing technologies, and in particular, to a method, an apparatus and a device for erasing handwriting on an electronic whiteboard.

BACKGROUND

An electronic whiteboard is an intelligent interaction device that combines many high-tech technologies such as a cutting-edge electronic technology and software technology. A user may write characters or draw patterns on an electronic whiteboard with an electronic stylus or a finger, and can also delete written and drawn content, to realize paperless office and teaching.

With the development of science and technology, electronic whiteboards are applied to more and more fields. Currently on the market, a method for erasing handwriting on an electronic whiteboard includes: using touch points formed by four fingers held together or a fist, and recognizing an erasing mode when the quantity of touch points is greater than 6 to 10 after pressing for the first time.

However, when the foregoing method is used, in a case of four fingers held together, the quantity of touch points on a multi-touch screen is not greater than 4, and the quantity of touch points between a first and the touch screen is generally not greater than 5. Therefore, when the foregoing method is run on a current device on the market, the device may fail to enter an erasing mode. Meanwhile, because a size of an erasing region can only be determined according to an area formed by four fingers held together or a first in the foregoing solution, the size of the erasing region is fixed. Therefore, the size of the erasing region cannot be controlled dynamically. Moreover, referring to FIG. 1, touch points uploaded at an initial position are ABCD. As the touch points are uploaded by the touch screen at a certain frequency, when the touch points move to $A_1B_1C_1D_1$ rapidly, the touch screen cannot upload all the touch points. As a result, handwriting in a partial region in the middle cannot be deleted.

SUMMARY

To solve the foregoing technical problem, the present disclosure provides a method, an apparatus and a device for erasing handwriting on an electronic whiteboard, to enter an erasing mode rapidly and erase handwriting effectively, thus improving the practicability of the electronic whiteboard. The technical solution is as follows:

An embodiment of the present disclosure provides a method for erasing handwriting on an electronic whiteboard, including:

obtaining first contact points; and enabling an erasing mode when a quantity of the first contact points is greater than a preset value;

obtaining second contact points in the erasing mode, and calculating an erasing region according to the first contact points and the second contact points; and deleting handwriting data in the erasing region.

In some embodiments of the present disclosure, the calculating an erasing region according to the first contact points and the second contact points specifically includes:

generating contact point variables, where the contact point variables include quantity information and position information of contact points in the erasing mode; and calculating a convex polygonal erasing region according to the contact point variables by using a convex hull algorithm.

In some embodiments of the present disclosure, the deleting handwriting data in the erasing region specifically includes:

dividing handwriting into a plurality of geometric figures; and determining whether the geometric figure intersects with the convex polygon; and deleting handwriting data of the geometric figure when the geometric figure intersects with the convex polygon.

In some embodiments of the present disclosure, the determining whether the geometric figure intersects with the convex polygon includes:

upon detecting that at least one endpoint of a line segment forming the handwriting is within the convex polygon, determining that the line segment intersects with the convex polygon.

In some embodiments of the first aspect of the present disclosure, the determining whether the geometric figure intersects with the convex polygon includes:

upon detecting that a line segment forming the handwriting intersects with any edge of the convex polygon, determining that the line segment intersects with the convex polygon.

In some embodiments of the first aspect of the present disclosure, the obtaining first contact points, and enabling an erasing mode when a quantity of the first contact points is greater than a preset value further includes:

exiting the erasing mode when a touch screen of the electronic whiteboard detects no contact point.

The present disclosure herein provides an apparatus for erasing handwriting on an electronic whiteboard, including:

a mode switching module, configured to obtain first contact points; and enable an erasing mode when a quantity of the first contact points is greater than a preset value;

a region calculation module, configured to obtain second contact points in the erasing mode, and calculate an erasing region according to the first contact points and the second contact points; and a data deletion module, configured to delete handwriting data in the erasing region.

In a first possible implementation of the second aspect of the present disclosure, the region calculation module further includes:

a variable generating module, configured to generate contact point variables, where the contact point variables include quantity information and position information of contact points in the erasing mode; and a convex hull calculation module, configured to calculate a convex polygonal erasing region according to the contact point variables by using a convex hull algorithm.

In some embodiments of the present disclosure, the data deletion module further includes:

a data parsing module, configured to divide handwriting into a plurality of geometric figures; and an intersection determining module, configured to determine whether the geometric figure intersects with the convex polygon; and delete handwriting data of the geometric figure when the geometric figure intersects with the convex polygon.

In some embodiments of the present disclosure provides a device for erasing handwriting on an electronic whiteboard, including a processor, a memory, and a computer program that is stored in the memory and configured to be executed by the processor, where when executing the computer program, the processor implements the above method for erasing handwriting on an electronic whiteboard.

Compared with the prior art, embodiments of the present disclosure have the following beneficial effects:

The present disclosure provides a method for erasing handwriting on an electronic whiteboard. When a user applies the method to a device, the erasing mode can be enabled provided that the user inputs, on a touch screen, first contact points of which the quantity is greater than a preset value. Compared with an existing erasing method in which contact points are inputted using a special gesture such as four fingers held together or a clenched fist, the method for erasing handwriting on an electronic whiteboard according to the present disclosure has higher recognition accuracy for contact points, which helps enter the erasing mode rapidly and improves use efficiency of the electronic whiteboard.

In the method for erasing handwriting on an electronic whiteboard according to the present disclosure, an erasing region is calculated according to first contact points and second contact points. Because positions and quantities of the first contact points and the second contact points on the touch screen can be customized by the user, the user can set the size of the erasing region as required. Compared with the prior art, the present disclosure is more flexible and practical. In addition, once being set, the erasing region is relatively stable, thus avoiding incomplete deletion of handwriting due to variations of the erasing region.

BRIEF DESCRIPTION OF THE DRAWINGS

FIG. 1 is an effect diagram of an erasing region of a method for erasing handwriting on an electronic whiteboard in the prior art;

FIG. 2 is a flowchart of steps of a method for erasing handwriting on an electronic whiteboard according to an embodiment of the present disclosure;

FIG. 3 is an effect diagram of an erasing region of a method for erasing handwriting on an electronic whiteboard according to an embodiment of the present disclosure;

DETAILED DESCRIPTION

Figure 4:
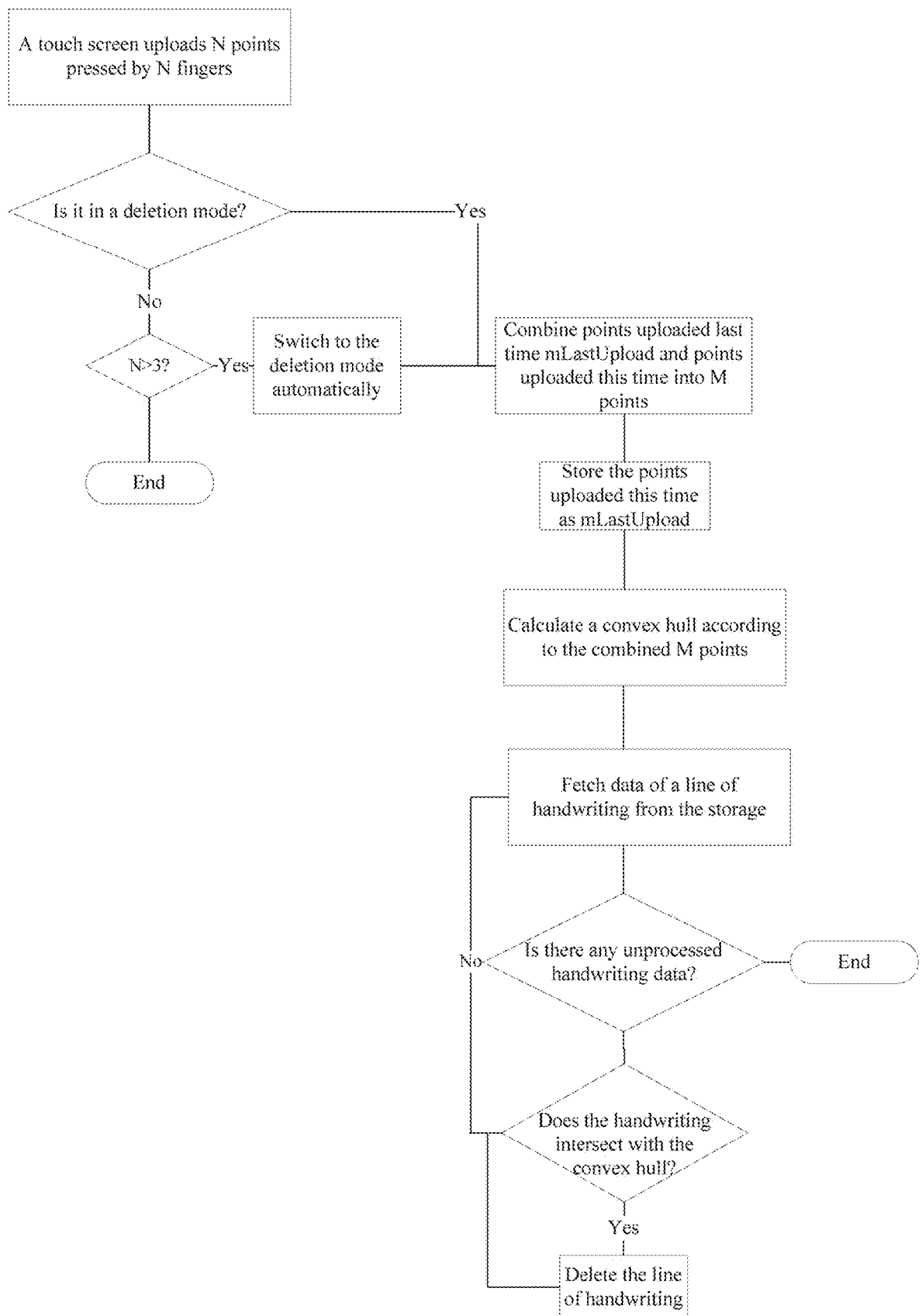
FIG. 4 is a flowchart of steps of a method for erasing handwriting on an electronic whiteboard using a convex hull algorithm according to an embodiment of the present disclosure.

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

FIG. 2 shows an exemplary embodiment of the present disclosure. A method for erasing handwriting on an electronic whiteboard includes the following steps:

S101: obtain first contact points; and enable an erasing mode when a quantity of the first contact points is greater than a preset value.

S102: obtain second contact points in the erasing mode, and calculate an erasing region according to the first contact points and the second contact points.

S103: delete handwriting data in the erasing region.

In this embodiment, the first contact points are contact points that are detected by a touch screen of the electronic whiteboard and initially inputted by a user. When the user touches the touch screen of the electronic whiteboard with N fingers simultaneously, a system uploads N points, and each point has coordinates (x, y) on the screen. In this embodiment, the preset value is set to 3, and when N>3, the erasing mode is entered. After the second contact points are obtained in the erasing mode, the erasing mode is exited. The second contact points are contact points that are detected by the screen and inputted by the user when exiting erasing mode. That is, when the user raises the hand, all the contact points disappear, and at the same time, the erasing mode is exited. Last contact points before the user raises the hand are the second contact points.

In a possible implementation of this embodiment, when detecting no contact point, the touch screen of the electronic whiteboard exits the erasing mode while recognizing last detected contact points as the second contact points.

In the method for erasing handwriting on an electronic whiteboard provided in the present disclosure, when a user applies the method to a device, the erasing mode can be enabled provided that the user inputs, on a touch screen, first contact points of which the quantity is greater than a preset value; alternatively, the erasing mode can be exited provided that the user does not touch the touch screen so that there is no contact point on the touch screen. Compared with an existing erasing method in which contact points are inputted using a special gesture such as four fingers held together or a clenched fist, the method for erasing handwriting on an electronic whiteboard according to the present disclosure has higher recognition accuracy for contact points, which helps enter the erasing mode rapidly and improves use efficiency of the electronic whiteboard.

In the method for erasing handwriting on an electronic whiteboard according to the present disclosure, an erasing region is calculated according to first contact points and second contact points. Because positions and quantities of the first contact points and the second contact points on the touch screen can be customized by the user, the user can set the size of the erasing region as required. Compared with the prior art, the present disclosure is more flexible and practical. In addition, once being set, the erasing region is relatively stable, thus avoiding incomplete deletion of partial handwriting due to variations of the erasing region.

Preferably, the calculating an erasing region according to the first contact points and the second contact points specifically includes:

generating contact point variables, where the contact point variables include quantity information and position information of all contact points in the erasing mode; and calculating a convex polygonal erasing region according to the contact point variables by using a convex hull algorithm.

It may be appreciated that, the convex hull is a concept in computational geometry (graphics). In a real-number vector space V, for a given set X, an intersection S of all convex sets including X is referred to as a convex hull. The convex hull of X may be constructed by using convex combinations of all points (X1, . . . Xn) in X. In a two-dimensional Euclidean space, the convex hull may be imagined as a rubber ring exactly encircling all the points.

In this embodiment, a variable mlastupload is defined to store data of the contact points uploaded by the touch screen. mlastupload is used for storing, upon recognition that a deletion mode has been entered, data uploaded by the touch screen last time. The variable is meaningful only in the deletion mode. After it is determined that the deletion mode has been entered, data of the first contact points for determining the entry into the deletion mode is uploaded for the first time after the entry into the deletion mode. When all the contact points disappear, it means that the deletion mode is exited. Therefore, the variable is initialized automatically.

Referring to FIG. 3, mlastupload and the N points uploaded this time can form a point set including M points. Next, data stored in mlastupload is replaced with data of the points uploaded this time. For the set of the M points that are uploaded successively, a convex hull may be calculated by using the convex hull algorithm, to obtain a convex polygon including all the points. The convex hull algorithm may be implemented using an existing algorithm, for example, a Graham scan method or a Jarvis march method.

FIG. 4 shows an exemplary embodiment of the present disclosure. A method for erasing handwriting on an electronic whiteboard includes the following steps:

obtaining first contact points; and enabling an erasing mode when a quantity of the first contact points is greater than a preset value;

obtaining second contact points in the erasing mode;

generating contact point variables, and storing data of the first contact points and the second contact points into the contact point variables, where the contact point variables include quantity information and position information of contact points in the erasing mode;

calculating a convex polygonal erasing region according to the contact point variables by using a convex hull algorithm;

obtaining position information from handwriting data and dividing handwriting into a plurality of geometric figures, where the geometric figures include, but are not limited to, a point, a line segment, a curve, a circle, and the like; and determining whether the geometric figure intersects with the convex polygon; and deleting handwriting data of the geometric figure when the geometric figure intersects with the convex polygon.

Figure 5:
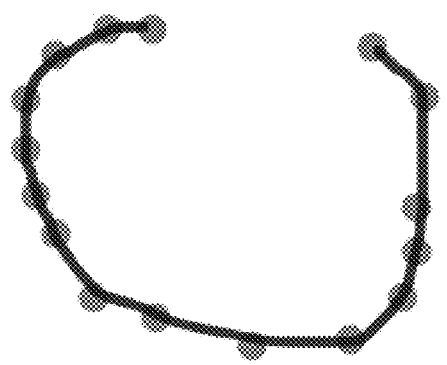
FIG. 5 is an effect diagram of dividing handwriting into a plurality of line segments in a method for erasing handwriting on an electronic whiteboard according to an embodiment of the present disclosure.

Referring to FIG. 5, it may be appreciated that in the electronic whiteboard, any line of handwriting may be considered as formed by a line connecting multiple points. Therefore, a line of handwriting in a computer may be represented by all points forming the line of handwriting.

In this embodiment, a convex polygon formed by multiple vertexes may be obtained through the convex hull algorithm. If the handwriting intersects with the convex polygon, the handwriting needs to be deleted. Determining whether the handwriting intersects with the convex polygon may be equivalent to determining whether each line segment forming the handwriting intersects with the convex polygon; if any line segment intersects with the polygon, the handwriting intersects with the convex polygon; otherwise, the handwriting does not intersect with the convex polygon.

Preferably, the determining whether the geometric figure intersects with the convex polygon includes:

upon detecting that at least one endpoint of a line segment forming the handwriting is within the convex polygon, determining that the line segment intersects with the convex polygon.

In this embodiment, it is assumed that two points forming the line segment are (X1, Y1), and (X2, Y2), and the convex polygon is formed by N vertexes. It is determined whether either of the two points forming the line segment is within the convex polygon; if yes, the line segment intersects with the convex polygon. An algorithm for determining whether a point is within a convex polygon may be implemented by C programming language as follows:

```
\\PointType is defined as:
structPointType
{
float x;
float y;
}
polygon \\ an array of n vertexes forming the convex polygonal, where point represents a vertex
    boolpolygon_content(constPointType* polygon, constPointType point)
    {
    if (polygon.empty( ))
        {
        return false;
        }
    booloddNodes = false;
    for (size_ti = 0, j = polygon.size( ) - 1;
    i<polygon.size( );
    i++)
        {
        if (((polygon[i].y <point.y&& polygon[j].y >= point.y) || (polygon[j].y <point.y&&
    polygon[i].y >= point.y))
            && (polygon[i].x <= point.x || polygon[j].x <= point.x))
            {
            oddNodes ^= (polygon[i].x + (point.y - polygon[i].y) / (polygon[j].y -
    polygon[i].y)*(polygon[j].x - polygon[i].x) <point.x);
            }
```

```
        j = i;
      }
   returnoddNodes;
  }
```

Preferably, the determining whether the geometric figure intersects with the convex polygon includes:

upon detecting that a line segment forming the handwriting intersects with any edge of the convex polygonal, determining that the line segment intersects with the convex polygon.

In this embodiment, if neither of the two points is within the convex polygon, to determine whether the line segment intersects with the convex polygon is to determine whether the line segment (X1, Y1) (X2, Y2) intersects with any edge (Xn−1, Yn−1) (Xn, Yn) of the convex polygon; and if yes, the line segment intersects with the convex polygon. An algorithm for determining whether two line segments intersect may be implemented as follows:

a convex hull calculation module, configured to calculate a convex polygonal erasing region according to the contact point variables by using a convex hull algorithm.

Preferably, the data deletion module further includes:

a data parsing module, configured to divide handwriting into a plurality of geometric figures; and an intersection determining module, configured to determine whether the geometric figure intersects with the convex polygon; and delete handwriting data of the geometric figure when the geometric figure intersects with the convex polygon.

Preferably, the intersection determining module is further configured to: upon detecting that at least one endpoint of a

```
   bool intersect(const PointType1 l1p1, const PointType2 l1p2, const PointType3 l2p1, const
PointType4 l2p2)
    {
      float delta = determinant(PointType1(l1p2.x - l1p1.x, l2p1.x - l2p2.x), PointType1(l1p2.y -
l1p1.y, l2p1.y - l2p2.y));
      if (delta <= (1e-6) && delta >= -(1e-6)) // delta=0, \\ representing that two line segments
coincide or are parallel
      {
        return false;
      }
      ValueTypenamenda = determinant(PointType1(l2p1.x - l1p1.x, l2p1.x - l2p2.x),
PointType1(l2p1.y - l1p1.y, l2p1.y - l2p2.y)) / delta;
      if (namenda> 1 || namenda< 0)
      {
        return false;
      }
      ValueTypemiu = determinant(PointType1(l1p2.x - l1p1.x, l2p1.x - l1p1.x),
PointType1(l1p2.y - l1p1.y, l2p1.y - l1p1.y)) / delta;
      if (miu> 1 || miu< 0)
      {
        return false;
      }
      return true;
    }
    float determinant(const PointType1 p1, const PointType1 p2)
    {
      return (v1.x * v2.y - v1.y * v2.x);
    }
```

Figure 6:
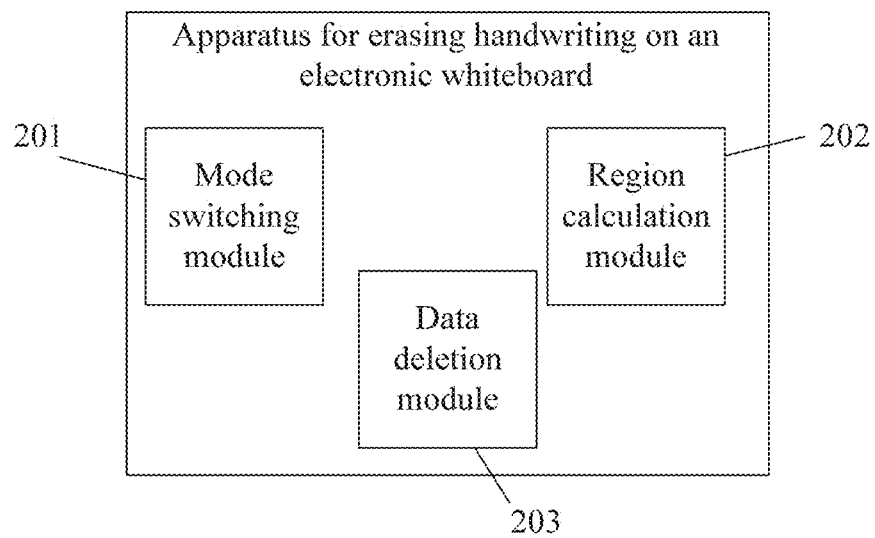
FIG. 6 is a module diagram of an apparatus for erasing handwriting on an electronic whiteboard according to an embodiment of the present disclosure.

FIG. 6 shows an exemplary embodiment of the present disclosure. An apparatus for erasing handwriting on an electronic whiteboard includes:

a mode switching module 201, configured to obtain first contact points; and enable an erasing mode when a quantity of the first contact points is greater than a preset value;

a region calculation module 202, configured to obtain second contact points in the erasing mode, and calculate an erasing region according to the first contact points and the second contact points; and a data deletion module 203, configured to delete handwriting data in the erasing region.

Preferably, the region calculation module further includes:

a variable generating module, configured to generate contact point variables, where the contact point variables include quantity information and position information of contact points in the erasing mode; and line segment forming the handwriting is within the convex polygon, determine that the line segment intersects with the convex polygon.

Preferably, the intersection determining module is further configured to: upon detecting that a line segment forming the handwriting intersects with any edge of the convex polygon, determine that the line segment intersects with the convex polygon.

Preferably, the mode switching module is further configured to exit the erasing mode when a touch screen of the electronic whiteboard detects no contact point.

In the present disclosure, the mode switching module and the region calculation module each may include one or more sensors and processors, or may be an integrated chip. The data deletion module may be one or more processors. If necessary, the data deletion module may further include a memory, a related interface, and a system transmission bus. The variable generating module and the convex hull calculation module may be independent processors or share a processor. The data parsing module and the intersection determining module may be independent processors or share a processor. The processor executes related code of a program to implement corresponding functions.

An exemplary embodiment of the present disclosure provides a device for erasing handwriting on an electronic whiteboard, including a processor, a memory, and a computer program that is stored in the memory and configured to be executed by the processor. When executing the computer program, the processor implements the foregoing method for erasing handwriting on an electronic whiteboard.

The descriptions above are preferred examples of the present disclosure, and it should be noted that for those of ordinary skill in the art, various improvements and modifications can be made without departing from the principles of the present disclosure. These improvements and modifications should also be regarded as falling into the protection scope of the present disclosure.

Those of ordinary skill in the art can understand that all or some of processes for implementing the methods of the foregoing embodiments can be completed by instructing relevant hardware through a computer program. The program may be stored in a computer readable storage medium. When the program is executed, processes of the embodiments of the foregoing methods may be included. The storage medium may be a magnetic disk, an optical disc, a read-only memory (ROM), a random access memory (RAM), or the like.

The invention claimed is:

1. A method for erasing handwriting on an electronic whiteboard, comprising:
    obtaining first contact points; and enabling an erasing mode when a quantity of the first contact points is greater than a preset value;
    obtaining second contact points in the erasing mode, and calculating an erasing region according to the first contact points and the second contact points; and
    deleting handwriting data in the erasing region;
    wherein the calculating an erasing region according to the first contact points and the second contact points specifically comprises:
    generating contact point variables, wherein the contact point variables comprise quantity information and position information of contact points in the erasing mode; and
    calculating a convex polygonal erasing region according to the contact point variables by using a convex hull algorithm;
    wherein the deleting handwriting data in the erasing region specifically comprises:
    dividing handwriting into a plurality of geometric figures; and
    determining whether the geometric figure intersects with the convex polygon; and deleting handwriting data of the geometric figure when the geometric figure intersects with the convex polygon;
    wherein the determining whether the geometric figure intersects with the convex polygon comprises:
    upon detecting that a line segment forming the handwriting intersects with any edge of the convex polygon, determining that the line segment intersects with the convex polygon.

2. The method for erasing handwriting on an electronic whiteboard according to claim 1, wherein the obtaining first contact points, and enabling an erasing mode when a quantity of the first contact points is greater than a preset value further comprises:
    exiting the erasing mode when a touch screen of the electronic whiteboard detects no contact point.

3. A device for erasing handwriting on an electronic whiteboard, comprising a processor, a memory, and a computer program that is stored in the memory and configured to be executed by the processor, wherein when executing the computer program, the processor implements the method for erasing handwriting on an electronic whiteboard according to claim 2.

4. A device for erasing handwriting on an electronic whiteboard, comprising a processor, a memory, and a computer program that is stored in the memory and configured to be executed by the processor, wherein when executing the computer program, the processor implements the method for erasing handwriting on an electronic whiteboard according to claim 1.

5. An apparatus for erasing handwriting on an electronic whiteboard, comprising:
    a mode switching module, configured to obtain first contact points; and enable an erasing mode when a quantity of the first contact points is greater than a preset value;
    a region calculation module, configured to obtain second contact points in the erasing mode, and calculate an erasing region according to the first contact points and the second contact points; and
    a data deletion module, configured to delete handwriting data in the erasing region;
    wherein the region calculation module further comprises:
    a variable generating module, configured to generate contact point variables, where the contact point variables comprise quantity information and position information of contact points in the erasing mode; and
    a convex hull calculation module, configured to calculate a convex polygonal erasing region according to the contact point variables by using a convex hull algorithm;
    wherein the data deletion module further comprises:
    a data parsing module, configured to divide handwriting into a plurality of geometric figures; and
    an intersection determining module, configured to determine whether the geometric figure intersects with the convex polygon; and delete handwriting data of the geometric figure when the geometric figure intersects with the convex polygon;
    wherein the intersection determining module is further configured to:
    upon detecting that a line segment forming the handwriting intersects with any edge of the convex polygon, determine that the line segment intersects with the convex polygon.

* * * * *